June 7, 1960 — W. H. HOGAN — 2,939,697

LIQUID SPRING

Filed Jan. 23, 1956

INVENTOR.
WALTER H. HOGAN
BY
ATTORNEY

United States Patent Office 2,939,697
Patented June 7, 1960

2,939,697
LIQUID SPRING

Walter H. Hogan, Olmsted Falls, Ohio, assignor to Cleveland Pneumatic Industries Inc., a corporation of Ohio Filed Jan. 23, 1956, Ser. No. 560,725

6 Claims. (Cl. 267—64)

This invention relates generally to shock absorbers and more particularly to a new and improved liquid spring mechanism.

It is an important object of this invention to provide a liquid spring incorporating means to compensate for temperature changes so that the spring will operate properly over wide temperature ranges.

It is another important object of this invention to provide a liquid spring including means which supply the proper precharge pressure regardless of the temperature of the spring.

It is still another object of this invention to provide a liquid spring wherein the leakage past the high pressure seal is automatically returned to the spring chamber each time the spring cycles.

Further objects and advantages will appear from the following drawings and descriptions, wherein.

Figure 1:
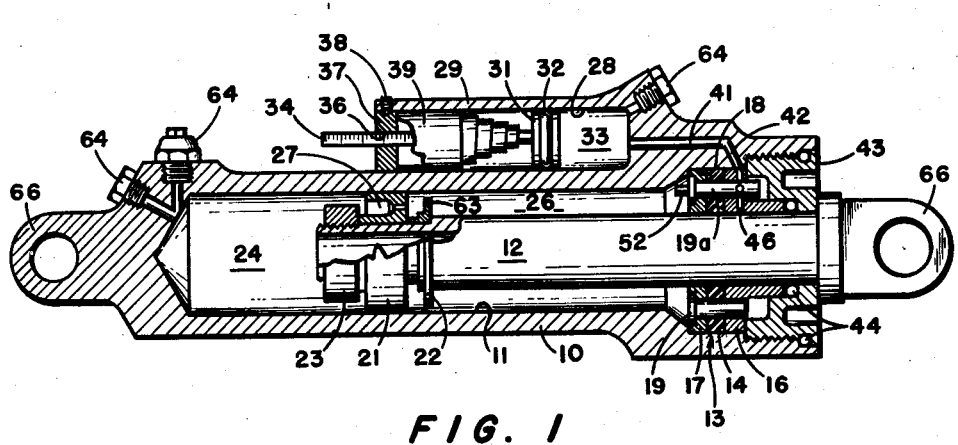
Figure 1 is a side elevation in longitudinal section of a preferred liquid spring according to this invention.
Figure 2:
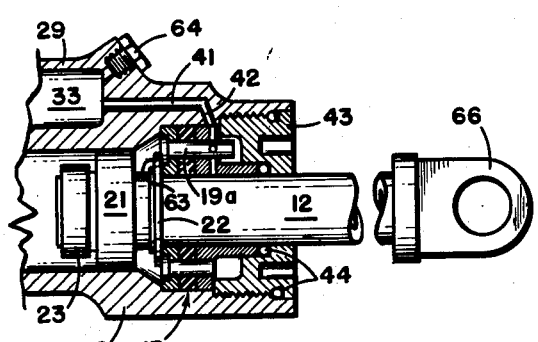
Figure 2 is a fragmentary longitudinal section of the seal end of the liquid spring showing the position the elements assume when the spring is in the extended position.

When liquid springs are installed in aircraft, difficulty is sometimes encountered due to the wide temperature ranges to which the aircraft is subjected. In normal operations, the precharge pressure of the liquid in the liquid spring is in the order of 1000# per square inch and the fully compressed pressure is in the order of 40,-000 to 60,000# per square inch. If a liquid spring is charged with liquid under pressure at a normal temperature of about 70° F. and then heated to approximately 160° F., the precharge pressure increases radically and over-pressure results as the spring is compressed. Conversely if after the initial precharge, the temperature of the spring is reduced to sub-zero tempertures, the precharge reduces and in some extreme cases a vacuum is developed. This results in a loss of the springs effectiveness because it radically changes pressure stroke relationship.

In a liquid spring according to this invention compensating means automatically correct for temperature changes and provide the proper precharge pressure for the existing temperature. To accomplish this I provide a reservoir chamber which is pressurized mechanically by a spring to the desired pressure in combination with valve means which connect the main liquid chamber of the spring with the reservoir chamber each time when the spring is in the fully extended position. Therefore, liquid within the main chamber can flow into the reservoir chamber as the liquid expands due to temperature increases or flow from the reservoir chamber into the main chamber as the liquid contracts due to temperature decreases.

Referring to the drawings, a preferred liquid spring according to this invention is provided with a cylinder 10 formed with an axial bore 11 into which a plunger 12 projects. A seal assembly 13, of the type disclosed in the patent to Bingham Number 2,308,149 is provided to prevent fluid leakage out of the bore 11 along the plunger 12. This seal assembly 13 provides a sealing force which is a function of the pressure being sealed and satisfactorily operates at the extreme pressures which occur in liquid springs. The seal assembly 13 includes a resilient packing 14 which is positioned between a back up plate 16 and a pressure plate 17. The packing 14 is squeezed between the two plates so that it expands in radial extent and presses against the plunger 12 and an axial wall 18 formed in the cylinder 10. A plurality of pins 19 projects through the packing 14, back up plate 16 and pressure plate 17 to insure that the sealing force on the packing 14 is always greater than the pressure of the liquid being sealed. For a more detailed description of the operation of this seal assembly, reference should be made to the Bingham patent cited above.

A piston head 21 is mounted on the plunger 12 between a valve operating member 22 and a threaded nut fastener 23 so that it is axially fixed relative to the plunger 12. The cylinder 10, plunger 12 and seal assembly 13 cooperate to define a cavity which is divided into a first chamber 24 and a second chamber 26 by the piston head 21. Both of the chambers 24 and 26 are completely filled with liquid when the plunger is in the right hand or extended position and pressurized to a precharge pressure which in most cases is less than 1000# per square inch.

The resulting forces of the liquid on the plunger 12 and piston head 21 may be resolved into two types; first the spring or compression forces and second the motion damping forces. A restricted flow connection is provided between the two chambers through an orifice 27 formed in the piston head 21 so the liquid pressure in these two chambers equalizes when there is no axial motion of the plunger 12 and piston head 21. Under this condition the liquid under pressure in the two chambers produces an axial force urging the plunger to the right toward the extending position. This force, which is the spring force, is equal to the pressure of the liquid times the effective area of the plunger 12 where it passes through the seal assembly 13. When the plunger 12 is moved to the left into the cylinder 10, the total volume of the two chambers 24 and 26 is reduced so the liquid is compressed to a higher pressure. Therefore, the spring force increases as the plunger 12 moves away from the extended position.

The damping force is a dynamic force which is created by motion of the piston head 21. Of course, movement of the piston head to the left decreases the volume of the chamber 24 and increases the volume of the chamber 26. This produces a differential pressure across the piston head 21 which resists the movement of the piston head and in turn of the plunger 12. Of course movement in the opposite direction causes a decrease of the volume of the chamber 26 and an increase of the volume of the chamber 24 which again produces a differential pressure across the piston head 21 to resist movement in this direction. The differential pressure, regardless of its direction, causes liquid to flow through the orifice 27 to the chamber having the lower pressure and therefore the pressure of the liquid in these two chambers tend to be equalized. The damping force is therefore a function of the rate of movement of the piston head and of the flow capacity of the orifice 27, and is only present when the plunger 12 and piston head 21 are moving.

The cylinder 10 is also formed with a reservoir bore 28 within a boss 29 on the cylinder 10. Positioned within the reservoir bore 28 is a sliding piston 31 which is provided with a resilient seal 32 that prevents leakage along the bore 28 past the piston so that the piston and bore cooperate to define a variable volume reservoir chamber 33. The piston 31 is provided with an indicator rod 34 which projects through a central bore 36 formed in an end member 37 which in turn closes the open end of the bore 28. A plurality of set screw fasteners 38 one of which is shown in the section of Figure 1 may be utilized to secure the end member 37 in position. A spring 39 extends between the piston 31 and the end member 37 and resiliently urges the piston to the right thus pressurizing liquid contained within the reservoir chamber 33. Since the area of the piston 31 is constant the pressure in the reservoir chamber is a function of the force of the spring 39. The reservoir chamber 33 is connected to the low pressure side of the seal assembly 13 by fluid passages 41 and 42.

A mounting member 43 is threaded into the end of the cylinder 10 and secures the seal assembly 13 in position and is also provided with resilient seals 44 which prevent leakage of liquid out of the cylinder past the mounting member. Thus a low pressure zone shown generally at Z is formed between the high pressure seal assembly 13 and the seals 44. The back up ring 16 is formed with a radial passage 46 which is open at one end to the passage 42 and at its other end to the low pressure zone. One of the pins which extend through the seal assembly 13 is made special and identified as 19a. It is formed with a normally closed valve which connects between the chamber 26 and the radial passage 46 to provide fluid communication between the chamber 26 and the reservoir chamber 33 when the valve is opened.

Figure 3:
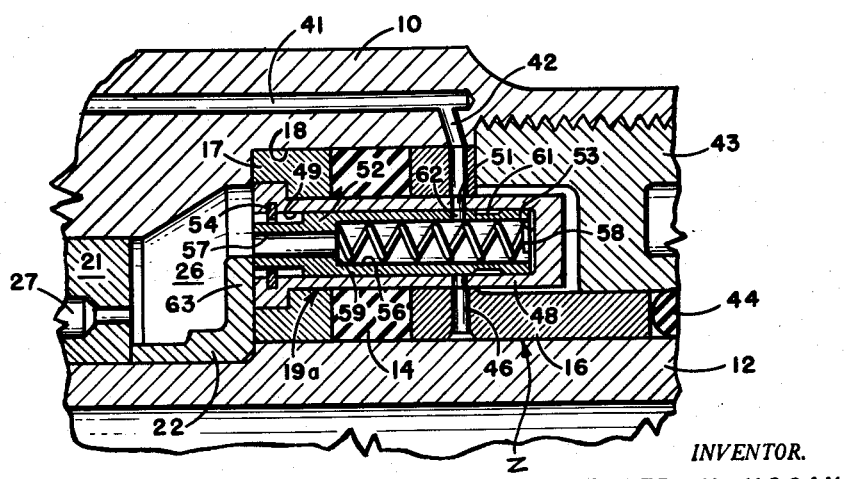
Figure 3 is an enlarged fragmentary cross section of the valve mechanism utilized to connect the main liquid spring chamber to the reservoir chamber; and, Figure 4 is a pressure stroke diagram illustrating the operation of a liquid spring according to this invention showing the effect of the temperature compensation.

The pin 19a (see Figure 3) provides a body member 48 formed with an axial bore 49 open at the left end to the chamber 26. A radial port 51 extends through the wall of the body member 48 and connects the bore 49 with the passage 46 within the back up member 16. A hollow valve plunger 52 is positioned within the bore 49 for limited axial motion between a radial end wall 53 and a snap ring 54. The valve plunger is formed with a first bore 56 and a second smaller co-axial bore 57 which is open to the chamber 26. A spring 58 extends between the end wall 53 and a shoulder 59 on the valve plunger 52 and resiliently urges the valve plunger to the left against the snap ring 54. When the valve plunger is in this position an annular recess 61 is positioned opposite the port 51 and the bore 56 is isolated from the port 51. When, however, the valve plunger is moved to the right hand position shown in Figure 3 at which time it seats against the end wall 53, a port 62 formed in the valve plunger 52 is aligned with the port 51 and fluid communication is provided between the chamber 26 and the reservoir chamber 33 through the passages 46, 42 and 41. The valve plunger 52 must be formed with a very close fit within the bore 49 so that the valve will not leak when it is closed. However, the pressure within the bore 56 when the liquid spring is compressed operates to press the valve plunger tightly against the wall of the bore 49 and therefore provides an increased sealing force when the pressure being sealed increases. The valve operating member 22 is formed with a radial flange 63 which engages the end of the valve plunger 52 when the plunger 12 moves to the fully extended position and opens the valve to provide fluid communication between the chamber 26 and the chamber 33, but the spring 58 maintains the valve in the closed position whenever the plunger 12 is in any position other than the fully extended position.

The cylinder 10 is preferably provided with filler and bleed members 64 through which liquid may be supplied to the liquid spring and air removed during the charging operation. Also, the cylinder 10 and plunger 12 are preferably formed with suitable mounting lugs 66 to connect the liquid spring to the associated structure.

In operation the liquid spring is filled with liquid to a precharge pressure of about 1000# per square inch, however, the value may vary with the particular design requirements. The precharging is done while the plunger 12 is in the fully extended position when all of the chambers 24, 26 and 33 are in fluid communication. The indicator rod 34 should be provided with markings calibrated in pounds per square inch pressure so that it will be easy to determine when the spring is properly charged. Since the pressure within the reservoir chamber 33 is always in the order of 1000# per square inch or less, adequate sealing is provided if the seals 32 and 43 are conventional O ring type seals. It should be understood that the chambers 24 and 26 are isolated from the reservoir chamber 33 when the plunger 12 moves from the extended position so the pressure in the reservoir chamber remains at the precharge pressure. Any liquid which may leak past the seal assembly 13 when the spring is compressed merely flows into the reservoir chamber 33 and does not escape from the unit. Such leakage increases the pressure within the reservoir chamber 33 because it compresses the spring 39 to a greater degree. Therefore, when the liquid spring is returned to the fully extended position the pressure within the reservoir chamber 33 is greater than the pressure within the chambers 24 and 26 by an amount caused by the leakage past the seal assembly 13 so as soon as the valve plunger 52 is moved to the opened position of Figure 3 the liquid will flow back into the chamber 26 from the reservoir chamber 33 and the liquid which has leaked past the seal assembly 13 is returned to the chambers 24 and 26. This is extremely important in most installations since it permits the liquid spring to operate satisfactorily even though some liquid may leak past the seal assembly 13 during the compression of the spring.

If the temperature of the liquid spring increases, the liquid within the chambers 24 and 26 expands and causes an increase of pressure within the chambers 24 and 26. If this occurs when the liquid spring is in the extended position, liquid will flow into the reservoir chamber 33 and prevent an unreasonable build up of the precharge pressure. A controlled amount of increase in the precharge pressure is desirable when the temperature of the liquid spring increases as will be discussed in detail later. Conversely when the temperature of the liquid spring and the liquid within the chambers 24 and 26 decreases the liquid contracts and liquid flows from the reservoir chamber 33 into the main chambers 24 and 26 when the liquid spring is in the extended position. This causes extension of the spring 39 which decreases the precharge pressure somewhat, the amount being determined by the spring rate of the spring 59. However, it is desirable to have a controlled decrease in the precharge pressure when the liquid spring cools.

Figure 4:
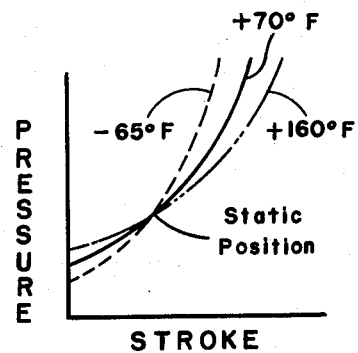

If the liquid spring is installed as the spring device of a landing gear, it is desirable to arrange the operation so that the plunger 12 will be in a predetermined position when the liquid spring is statically supporting the weight of an aircraft regardless of the temperature of the liquid spring. It has been found in actual practice that the compressibility of most liquids varies with the temperature of the liquid and that a higher spring rate results if the liquid is cooled and a lower or flatter spring rate results if the liquid is hot. This is shown in Figure 4 where three curves are shown: one for −65° F., one for 70° F. and the last for 160° F. If the precharge pressure were maintained constant regardless of the temperature, the static position which the spring would then assume when it is supporting the aircraft on the ground would vary due to the difference in the compressibility of the liquid. Therefore it is desirable to arrange the mechanism so that the precharge pressure is reduced a controlled amount when the temperature goes down and increased a controlled amount when the temperature goes up so that a single static position will be provided regardless of the temperature of the liquid spring. By properly choosing the spring rate of the spring 39 when compared to the total volume of the chambers 24, 26 and 33 the proper precharge pressure will be provided regardless of the temperature of the liquid spring. In other words, when the liquid contracts due to cooling within the three chambers, the spring 39 extends and reduces the precharge pressure. Conversely when the liquid within the three chambers expands due to an increase in temperature, the piston 31 moves to the left and compresses the spring 39, thereby increasing the precharge pressure. Those skilled in the art will recognize that the precharge pressure is a function of the force of the spring 39 and the area of the piston 31 and that proper proportion of the elements will insure that the proper pressure will be provided regardless of the temperature of the spring.

A spring according to this invention is particularly desirable for use in aircraft landing gears since large temperature changes occur when the airplane flies from one climatic zone to another and since the liquid spring is in the fully extended position when the aircraft is airborne, all major changes in temperature are properly compensated for as they occur. Also, any leakage which might pass the high pressure seal assembly 13 is automatically returned to the main chambers of the liquid spring when the liquid spring moves to the extended position. Again since the precharge pressure is changed to compensate for differences in the compressibility of the liquid which are created by changes in the temperature of the liquid, a fully compensated mechanism is provided.

Although a preferred embodiment of this invention is illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:
1. A liquid spring comprising cylinder and plunger members capable of relative movement between an extended and a compressed position cooperating to define a liquid filled cavity the volume of which is reduced by relative movement toward said compressed position, a source of pressure liquid, and normally closed valved means operable only by relative movement between said members to said extended position to provide fluid communication for flow in both directions between said source of pressure liquid and cavity.

2. A liquid spring comprising a cylinder, a plunger projecting into said cylinder, high pressure seal means engaging said cylinder and plunger cooperating therewith to define a liquid filled cavity the volume of which is changed by relative movement between said plunger and cylinder, low pressure seal means on the side of said high pressure seal means remote from said cavity engaging said cylinder and plunger whereby a low pressure zone is formed around said plunger between said seal means, normally closed valved means operable by relative movement between said cylinder and plunger to a predetermined position to provide fluid communication between said cavity and low pressure zone and means for supplying liquid under pressure to said low pressure zone.

3. A liquid spring comprising a cylinder, a plunger projecting into said cylinder, high pressure seal means mounted in said cylinder engaging said plunger and cooperating with said plunger and cylinder to define a liquid filled cavity the volume of which is changed by relative movement between said plunger and cylinder, low pressure seal means mounted in said cylinder on the side of said high pressure seal mean sremote from said cavity engaging said cylinder an dplunger whereby a low pressure zone is formed around said plunger between said seal means, normally closed valved means operated by said plunger when it reaches a predetermined position relative to said cylinder to provide fluid communication between said cavity and zone, and means for supplying liquid under pressure to said low pressure zone.

4. A liquid spring comprising a cylinder, a plunger projecting into said cylinder, high pressure seal means engaging said cylinder and plunger cooperating therewith to define a liquid filled cavity the volume of which is changed by relative movement between said plunger and cylinder, low pressure seal means on the side of said high pressure seal means remote from said cavity engaging said cylinder and plunger whereby a low pressure zone is formed around said plunger between said seal means, normally closed valved means operable by relative movement between said plunger and cylinder to a predetermined position to provide fluid communication between said cavity and low pressure zone, said cylinder being formed with a chamber filled with liquid stored therein in fluid communication with said low pressure zone, and spring means within said chamber pressurizing the liquid stored therein.

5. A liquid spring comprising cylinder and plunger members capable of relative movement between a first and a second position cooperating to define a cavity the volume of which is reduced by relative movement between said members toward said first position, said cylinder being formed with a reservoir bore, a sliding piston in said bore cooperating therewith to define a reservoir chamber, liquid filling said cavity and chamber, spring means urging said piston in a direction toward the liquid in said chamber with a force which is reduced as said piston moves in said direction and increased as said piston moves in the opposite direction whereby the pressure in said chamber increases when the volume of liquid therein increases and decreases when the volume of liquid therein decreases, and valved means providing fluid communication between said chamber and cavity only when said members are in said second position.

6. A liquid spring comprising cylinder and plunger members axially movable relative to each other, high pressure seal means extending between said members cooperating therewith to define a liquid filled cavity the volume of which is changed by relative movement, low pressure seal means extending between said members on the side of said high pressure seal means remote from said cavity whereby a low pressure zone is provided between said seal means, a source of liquid connected to said low pressure zone, said high pressure seal means including a plurality of pins extending therethrough from said cavity to said low pressure zone, one of said pins being formed with valved means operable by relative movement between said members to a predetermined position to provide fluid communication for flow in both directions between said low pressure zone and cavity.

References Cited in the file of this patent

UNITED STATES PATENTS

| | | |
|---|---|---|
| 2,566,736 | Levy | Sept. 4, 1951 |
| 2,620,182 | Marston | Dec. 2, 1952 |
| 2,643,112 | Smith | June 23, 1953 |
| 2,648,949 | Taylor | Aug. 18, 1953 |
| 2,756,989 | Peras | July 31, 1956 |
| 2,785,887 | Taylor | Mar. 19, 1957 |

FOREIGN PATENTS

| | | |
|---|---|---|
| 105,053 | Great Britain | Mar. 2, 1917 |